# United States Patent [19]

Deaton et al.

[11] 3,884,718

[45] May 20, 1975

[54] RADIOACTIVE BATTERY

[75] Inventors: Ronald L. Deaton, Germantown; Gary L. Silver, Centerville, both of Ohio

[73] Assignee: The United States of America as represented by the Energy Research and Development Administration, Washington, D.C.

[22] Filed: Apr. 19, 1973

[21] Appl. No.: 352,827

[52] U.S. Cl...... 136/83 R; 136/100 R; 204/157.1 R
[51] Int. Cl. .......................................... H01m 29/00
[58] Field of Search...... 136/83 R, 100 R, 137, 146, 136/20, 6 R, 6 F, 6 B, 26, 86 A, 86 D, 86 E; 310/3 R

[56] References Cited
UNITED STATES PATENTS

| | | | |
|---|---|---|---|
| 1,182,513 | 5/1916 | Thofehrn | 136/26 |
| 1,217,739 | 2/1917 | Flannery | 136/146 |
| 1,317,082 | 9/1919 | Hartenheim | 136/146 |
| 2,900,535 | 8/1959 | Thomas | 136/100 R |
| 3,019,358 | 1/1962 | Ohmart | 136/100 R X |
| 3,219,486 | 11/1965 | Gumucio | 136/86 A |
| 3,255,044 | 6/1966 | Powers et al. | 136/86 |
| 3,468,714 | 9/1969 | Gumucio | 136/121 X |
| 3,492,160 | 1/1970 | Silver | 136/83 R X |

*Primary Examiner*—Anthony Skapars
*Attorney, Agent, or Firm*—Dean E. Carlson; Dudley W. King; Ignacio Resendez

[57] ABSTRACT

A radioactive battery comprising a container housing an electrolyte, two electrodes immersed in the electrolyte and insoluble radioactive material disposed adjacent one electrode. Insoluble radioactive material of different intensity of radioactivity may be disposed adjacent the second electrode.

6 Claims, 3 Drawing Figures

RADIOACTIVE BATTERY

BACKGROUND OF INVENTION

The invention relates to radioactive voltaic batteries utilizing insoluble radioactive material within a single electrolyte.

Currently used batteries or cells such as described in U.S. Pat. No. 3,492,160 operate upon the principle of potential differences generated when solutions of plutonium-238 (Pu-238) in differing concentrations of acids were contacted by means of such as a salt bridge, i.e., they operate upon potential differences caused by acid dependent potentials. These voltaic batteries require a two cell structure, a salt bridge and a soluble form of the radioactive material within the electrolyte. The electrolytes used were chemically different or of different concentration.

This invention provides a voltaic battery which uses insoluble radioactive material, such as plutonium-238 dioxide ($238PuO_2$) microspheres, a single electrolyte and does not require a salt bridge. The battery of this invention may be utilized in medicine where a need for small, radioactive batteries for implantation within the human body exists, or in any other instance where a low output cell or battery is desirable.

Further, with the advent of large scale electrical energy generation by nuclear means, the problem of economical uses of by-product radioisotopes has increased. These radioisotopes may find application in the batteries of this invention.

SUMMARY OF INVENTION

In view of the above, it is an object of this invention to provide a battery which is compact and has less components than prior art batteries.

It is a further object of this invention to provide a use for by-product radioisotopes generated in large scale electrical energy generation by nuclear means.

It is a further object of this invention to provide a radioactive battery suitable for implantation within the human body.

It is a further object of this invention to provide a novel voltaic battery which uses insoluble $238PuO_2$ microspheres and requires only one electrolyte.

Various other objects and advantages will become apparent from the following description of this invention, and the most novel features will be pointed out with particularity hereinafter in connection with the appended claims. It is understood that various changes in the details and materials which are herein described and illustrated to better explain the nature of the invention may be made by those skilled in the art without departing from the scope of this invention.

The invention comprises, in brief, a radioactive battery comprising a housing containing an electrolyte, two electrodes each having an end immersed within the electrolyte and another end outside of the housing, and insoluble radioactive material disposed adjacent one electrode. Insoluble radioactive material having a different intensity of radioactivity may be disposed adjacent the other electrode.

DETAILED DESCRIPTION

Figure 1:
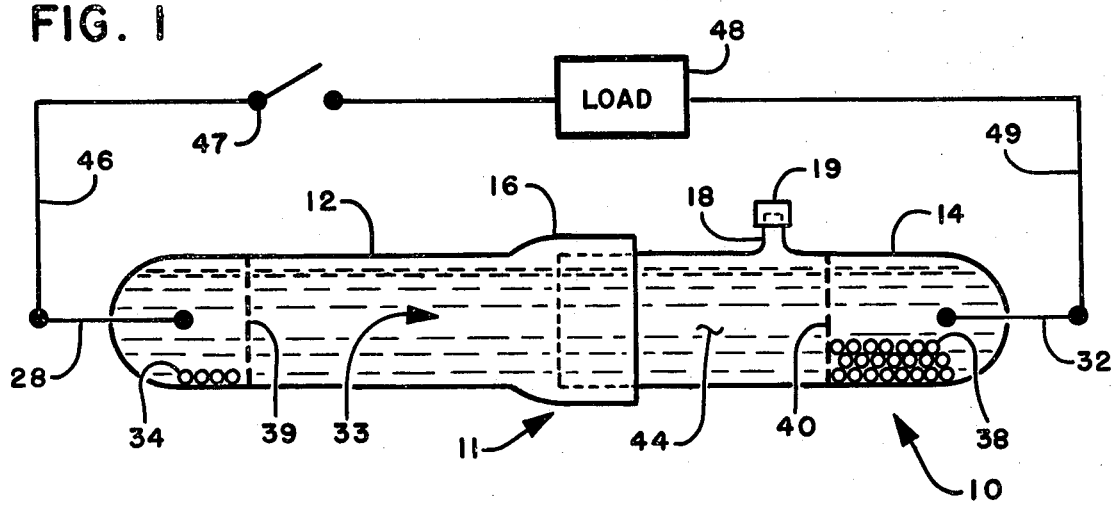
FIG. 1 illustrates in diagrammatic fashion the voltaic cell or battery of this invention.

The diagrammatic illustration of the cell or battery 10 as shown in FIG. 1 may comprise a housing 11 made of two separate glass or the like containers 12, 14 joined at junction 16 by means of such as a ground glass joint. The containers may be made of any suitable material such as glass, noble metal such as iridium, and fused ceramic materials. Disposed at an appropriate part of housing 11 may be an inlet port 18 having a cap or cover 19 suitably attached thereto to prevent flow of fluid out of housing 11. Electrodes 28, 32 made of suitable electrode materials which are not corroded or otherwise adversely affected by the electrolytes hereinbelow described may be used, and are such as platinum, iridium, graphite, conductive ceramic, gold platinized platinum, etc. These may be disposed extending through the wall of housing 11 in sealed arrangement. One of these electrodes is the anode and one is the cathode. A portion of each of the electrodes extends into chamber 33 which is the volume enclosed within housing 11 after the joint 16 has been closed. Disposed adjacent one of the electrodes 28 is a suitable amount of radioactive material, shown in FIG. 1 as radioactive microspheres 34. Disposed adjacent the other electrode 32 is a suitable quantity of radioactive material, shown in FIG. 1 as radioactive microspheres 38 such that the radioactive emission level of material 34 is at least about 10 % different than the radioactive emission level of the material 38. As shown in FIG. 1, the microspheres 34 and 38 are retained in their respective locations by porous walls 39, 40 which do not permit passage of the microspheres 34 and 38 respectively out of the areas adjacent the electrodes 28 and 32 while permitting movement of electrolyte and ions therethrough. Although the radioactive material is termed microspheres, any other form may be used such as granules, particles, etc.

Walls 39 and 40 may be made of any suitable material such as the material of housing 11, described above or may be made of any other suitable materials such as sintered ceramic. Cap 19 may be removed from port 18 and a suitable electrolyte 44 may be input into chamber 33 until housing 11 is substantially full. Cap 19 may be thereafter replaced upon conduit 18. Conduit 18 may preferably be disposed, for ease of filling, at some point intermediate porous walls 39 and 40. Electrodes 28 and 32 also extend past the wall of housing 11 to facilitate connection thereto with appropriate electrical conductors 46, 49 for use of the battery of this invention.

The electrical circuit established by the embodiment of FIG. 1 uses electrical conductors 46, 49 and switch 47 to allow current to flow through circuit load 48.

Figure 2:
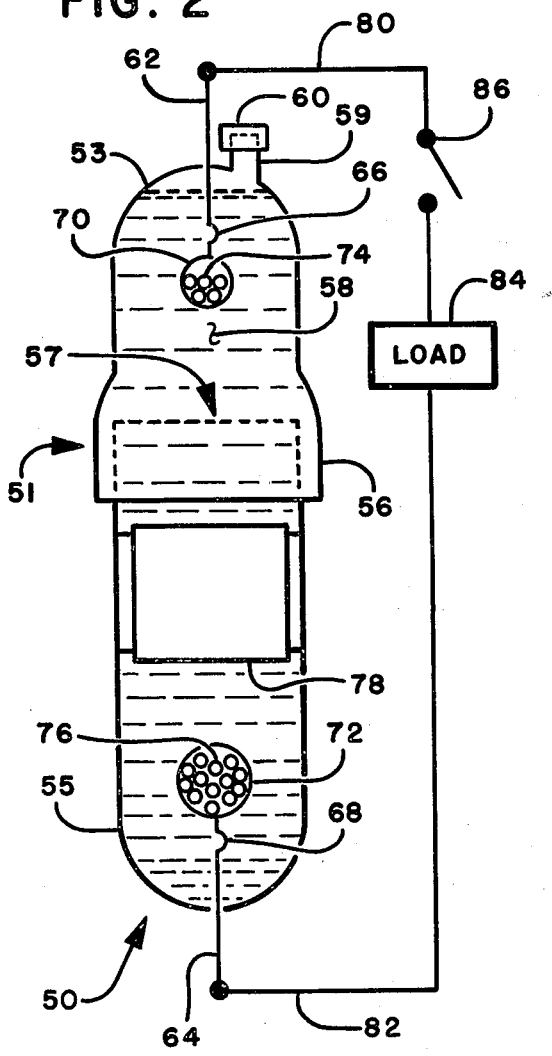
FIG. 2 illustrates, again in diagrammatic fashion, an alternate embodiment of this invention.

The voltaic battery 50 diagrammatically illustrated in FIG. 2, comprises the housing 51 made of any suitable material such as described above for housing 11. Housing 51 may comprise two separate containers 53, 55 joined together at junction 56 through any suitable means such as a ground glass joint 56. These containers 53, 55 form therewithin a chamber 57 for containment of electrolyte 58. Disposed at a portion of housing 51, such as shown in FIG. 2, may be a suitable conduit 59 having a cover or plug 60. The function of this conduit and plug is similar to that of conduit 18 and plug 19 of the FIG. 1 embodiment. Also disposed through the walls of housing 51 are at least two electrodes 62, 64 which may have depending therefrom suitable attaching means such as a wire or hook 66, 68 onto which is attached a container 70, 72 which may be such as a wire mesh screen containing radioactive material such as microspheres 74, 76. Also disposed within the electrolyte and within the housing 51 may be different configurations of a suitable material which acts as a catalyst for the reaction occurring within the battery to be described hereinbelow. These materials, such as platinum or platinized platinum, may depend from the walls of housing 51 or may be, as shown in FIG. 2, a screen or shield 78 annularly disposed within housing 51 between electrodes 62 and 64. Platinized platinum refers to platinum electroplated with a deposit of platinum and having a very high surface area to facilitate electrochemical reactions.

The circuit established by the embodiment of FIG. 2 uses electrical conductors 80, 82 and switch 86 to allow current to flow through circuit load 84.

Figure 3:
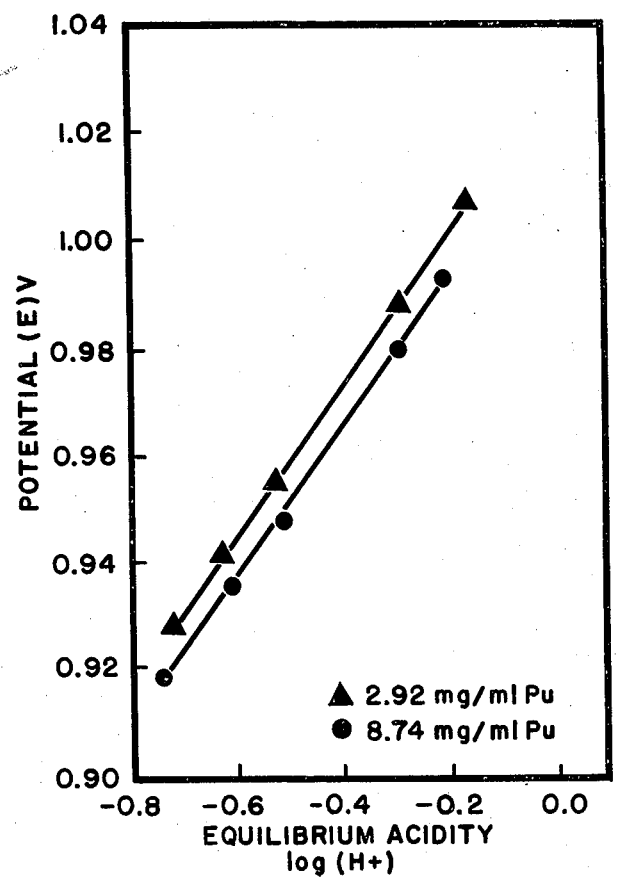
FIG. 3 is a graph illustrating potential as a function of equilibrium acidity applicable to Pu-238 solutions in dilute nitric acid.

The principle upon which the voltaic battery of this invention operates is described below. Prior art batteries operated upon potential differences caused by acid dependent potentials as shown in FIG. 3, which plots potential versus equilibrium acidity for two plutonium solutions of different Pu-238 concentration in dilute nitric acid. It can be seen that potential differences are observed between, for example, Log $(H^+) = -0.2$ and Log $(H^+) = -0.7$. Thus by connecting solutions of differing potential, a battery may be made.

A battery of this invention overcomes prior art difficulties and provides novel aspects by operating on a different principle. In FIG. 3, it will be noted that for any particular acidity, for example, Log $(H^+) = -0.4$, solutions having the same acidity but differing plutonium concentration display a potential difference. The potentials of radioisotopic solutions, such as 238 plutonium, are attributable to the radioactivity of the radioisotopic material or radioactive material, and depend not only upon the acid concentration as shown in FIG. 3, but also upon the particular acid. It has been discovered that the radioactive material need not be dissolved in solution but that insoluble forms of this radioactive material also display the characteristic radiation and, as such, may be used in the insoluble form within the solution. Moreover, differences in the amount of or concentration of radioactive radiations may easily be achieved by using differing quantities of insoluble radioactive microspheres. It is then possible to prepare within one homogeneous solution, that is, a single electrolyte, regions in proximity to the radioactive microspheres wherein potential differences are induced by way of radiation intensity differences. FIGS. 1 and 2 show two embodiments of this battery.

Other arrangements and modifications may be made to the illustrated embodiments to improve efficiency, minimize physical size or weight, or increase output. The housing geometry, for example, may be similar to that used in conventional batteries instead of being in the form of an elongated tube. A multiplicity of cells or batteries may be connected in parallel or series to increase voltage or current output, and radioactive materials, electrolytes and electrode materials other than those recited herein may be used for improving output, life, etc.

Batteries using the principle discussed above are diagrammatically illustrated in FIGS. 1 and 2. Batteries have been constructed using small glass tubes fitted together centrally by means of a connection such as a ground glass joint. Electrodes, which may be made of platinum, platinized platinum or other suitable materials, were sealed into and extending through these tubes. A portion of the electrode extended into the chamber formed by the connected tubes and a portion of the electrode extended to the exterior of the housing.

Microspheres of elements such as thorium, cerium, curium, cobalt, uranium and the like containing an alpha, beta, or gamma emitting radioisotope may be used as the radioactive material in each embodiment. Alpha emitters may be more desirable for use because the alpha particle dissipates its energy over shorter distances when interacting with matter than either beta or gamma radiation. In addition, beta or gamma radiation may escape the system in which such emitters are contained, carrying along much of the energy of such radiation.

It should be understood that radioactive material may need to be disposed adjacent only one of the electrodes provided only that the electroactive species at the electrode behaves reversibly, i.e., undergoes electrical oxidation and reduction quickly and easily. The $Br^-$, $Br_2$ system is an example of such a reversible system.

Whether an electrode is a cathode or anode is determined by the intensity of radiations at the electrode. In using hydrobromic acid as the electrolyte as discussed below, the anode will be the electrode with the lesser amount of radioisotope. The electrode with the greater amount of radioisotope will have the greater amount of $Br_2$ generated by the radioactivity. At the cathode, the large excess of $Br_2$ will react

$$Br_2 + 2e = 2\ Br^- \qquad (1)$$

so that bromine is reduced. At the anode, $Br^-$ is oxidized:

$$2\ Br^- = Br2 + 2e \qquad (2)$$

As such, the radioactivity serves to establish concentration differences and the battery is a concentration cell. Reference to "adjacent an electrode" as used herein means that the radioactive material may be at from about actual physical contact to about 1 cm distance from the electrode for these reasons:

1. to minimize time of diffusion of electroactive species to the electrode surface;
2. to maximize concentration of electroactive species at electrode surface; and
3. to allow utilization of short lived unstable species which may be electroactive.

Although the type of radioisotope used and the form that it is in may be varied, the use of $^{238}PuO_2$ microspheres made by the method described in U.S. Pat. No. 3,171,714 entitled "Method of Making Plutonium Oxide Microspheres" has been successful. Examples of other radioactive materials which may be used are such as curium—244, thorium —229 and —230, and actinium—227, in the form of microspheres, granules, and the like. The plasma fired $^{238}PuO_2$ microspheres which were used are very inert and insoluble. The size of the microspheres used is not critical and the range may be maintained such as between about 1 and about 5000 microns and preferably at about 100 microns.

The amount of microspheres used at each electrode will be determined by the amount of current and voltage required from the battery of this invention, the type of electrolyte used, the operating environment, and other variables such as the amount of heat generated by the radioisotope.

The electrolyte to be used is selected based upon a consideration of several factors. These include the type of radioisotope used, the geometrical configuration of the housing, the amount of current required, reaction which occurs in the electrolyte, reversibility of that reaction, corrosion resistance and other physical properties of the microspheres and housing to electrolyte, possibility of undesirable secondary electrolyte chemical reactions, and the like. Dilute hydrobromic acid (at a concentration of from about 0.5 to about 2.0 Normal) has been selected in one of the embodiments of this invention because bromine, one possible product of the irradiation of dilute solutions of hydrobromic acid, is soluble in water and would thus not be an undesirable gaseous product. Moreover, the bromine-bromide oxidation-reduction couple is relatively reversible, thus allowing a more rapid poising or stabilizing of the electrodes so that battery voltages may be less erratic than, for example, what would be allowed if a relatively irreversible couple such as nitrate-nitrous acid ($NO_3^-$ — $HNO_2$) were used.

Using dilute hydrobromic acid as electrolyte, the most readily oxidizable material is a bromide ion and the most readily reducible material is the hydrogen ion. Since oxidation and reduction within a closed system occur to equal extent, hydrogen gas in the form of bubbles accompanies irradiative generation of bromine. Unless the hydrogen and bromine can be combined, the hydrogen bromide electrolyte would be depleted. This problem is eliminated in the present invention by providing a catalytic surface, which may be the electrode surface, to regenerate the hydrogen bromide from radiatively generated hydrogen and bromine so that excessive amounts of hydrogen gas do not accumulate. In the embodiment of FIG. 2, not only do the electrodes act as catalytic surfaces to regenerate the hydrogen bromide, but a platinum or platinized platinum shield or screen 78 or other suitable material may be provided to effect the same purpose. Hence, the net result is that the battery of this invention provides a method for regenerating its own electrolyte.

Another example of an electrolyte which may be used is copper (II) chloride in water at a concentration of from about 0.01 molar to about 5 molar. The molarity of the solution is to be determined by the amount of voltage required, the type of electrode used, the type of radioisotope used and the like. In this case, the generation of chlorine for electrochemical reactions may be accompanied by the precipitation of copper metal or copper (I) chloride. The chlorine may dissolve in the electrolyte or, alternatively, form chlorine gas bubbles which rise in the electrolyte. Precipitation of copper causes it to sink in the electrolyte effecting a physical separation of copper and chlorine. If the above or like embodiments are employed, since the battery housing is of closed finite geometry, dissolved chlorine gas would ultimately diffuse into proximity of the precipitated copper and, since the oxidation of copper by chlorine is favorable, the combination will regenerate the electrolyte copper (II) chloride. Again, recombination of radiolytically generated species regenerates the electrolyte. The solvent, which is water in this case, may also be decomposed into hydrogen and oxygen and may also be regenerated on the platinum catalytic surface. This again prevents solvent depletion and gas accumulation in the battery.

Any electrolyte capable of contributing a reversible electrode couple in the presence of raioactivity may be used. Examples of other electrolytes which may be used are hydrochloric acid; iron chloride in hydrochloric acid as well as other salts in hydrochloric acid which show an oxidizable and reducible form such as $Fe^{++}$ and $Fe^{+++}$; and nitric acid; or tin salts, vanadium salts, plutonium salts, etc., which have two or more oxidation states in solution and which oxidize and reduce with ease.

Tables I and II illustrate results obtained using a battery of this invention having the configuration schematically illustrated in FIG. 1. The housing was made of glass tubing and the overall length, when joined, was 3 inches with a maximum diameter of ½ inch. Platinum wire was used as electrodes in both batteries. In the battery of Table I, the electrolyte was about 2 molar hydrobromic acid, the radioactive material placed adjacent the cathode was about 200 milligrams of $PuO_2$ microspheres, the radioactive material placed adjacent the anode was about 50 milligrams of $PuO_2$, and the electrodes were platinum wire.

In the battery of Table II the electrolyte was 0.5 hydrobromic acid, the radioactive material placed adjacent the cathode was about 100 milligrams of $PuO_2$ microspheres, the radioactive material placed adjacent the anode was about 5 milligrams of $^{238}PuO_2$ microspheres, and the electrodes were platinum wire. In both batteries, the $PuO_2$ microspheres contained about 80 isotope percent of plutonium-238 and about 20 isotope percent of plutonium-239. In preparing the batteries for testing, the microspheres to be used were thoroughly washed with about 2 molar hydrobromic acid and then each half of the battery, that is, glass tubes or containers 12 and 14 of FIG. 1 containing lesser and greater quantities of microspheres respectively, was allowed to stand overnight in about 2 molar hydrobromic acid so that radiation induced oxidation-reduction products could accumulate. The two halves of the battery were then placed together and the voltage displayed by the battery observed for a period of time. A similar battery was prepared with 0.5 molar hydrobromic acid. Results of the voltage measurements are shown in Tables I and II respectively.

TABLE I

VOLTAGE OF $Pu^{238}$ RADIATION CELL

| Time* (minutes) | Open Circuit Voltage (mV) | Voltage Across 1000 ohm Resistor (mV) |
| --- | --- | --- |
| 15 | 1.40 | |
| 45 | 2.38 | |
| 75 | 3.35 | |
| 105 | 2.54 | |
| 135 | 4.37 | |
| 165 | 5.30 | |
| 195 | 5.90 | |
| 285 | 6.68 | 6.28 |
| 375 | 8.03 | 7.06 |
| 405 | 8.14 | 7.10 |
| 465 | 8.27 | 7.01 |

*After battery preparation

TABLE II

VOLTAGE OF Pu-238 RADIATION CELL

| Time* (minutes) | Open Circuit Voltage (mV) | Voltage Across 1000 ohm Resistor (mV) |
|---|---|---|
| 0 | 13.05 | |
| 30 | 22.45 | |
| 60 | 28.70 | |
| 90 | 34.00 | |
| 120 | 36.80 | |
| 180 | 32.45 | |
| 210 | 34.37 | |
| 240 | 36.26 | 21.60 |
| 270 | 36.75 | |
| 300 | 35.19 | 22.27 |
| 330 | 35.99 | |
| 360 | 35.23 | 19.40 |
| 390 | 35.50 | |

*After battery preparation

The principle of the hydrobromic acid battery is as follows. The potential of each electrode is given in millivolts approximately by equation $$E = E° + 60 \log \left(\frac{Ox}{Red}\right)$$

where "Ox" represents the concentration of radiation induced oxidizing agents, such as bromine, and "Red" represents the concentration of the bromide ion which is the reduced form of the reduction-oxidation couple. In this case "E°" would represent the standard potential of the bromine-bromide couple. For each electrode, "E°" is the same as is "Red" (since only one homogenous electrolyte is used). The "Ox" term will differ however, because of the different rates of irradiation in the different ends of the cell. Hence, a battery may be constructed in principle by connecting the identical platinum wire electrodes.

Advantages of this type of battery are (1) there is only one electrolyte used (2) a need for a salt bridge is eliminated and consequently a more simple and rugged battery design is possible and (3) since there is only one electrolyte, there is not problem of mixing of electrolytes. The radioactive microspheres may be suspended mechanically by the electrodes in such as wire baskets 70, 76 as shown in FIG. 2. Since the radioactive material is insoluble and localized, accidental breakage of the battery will not result in wide spread radioactive contamination. As the voltage capable of being generated is not related to the quantity of radioisotope in a simple linear way as in the case of thermal batteries, very small quantities of radioisotope might be practical and no cooling mechanisms would be required to dissipate heat.

If gamma radiation producing elements are used as radioactive elements, the electrode area may require shielding. If they are not gamma producing, no shielding will be required.

What is claimed is:

1. A radioactive battery comprising a housing, an electrolyte, said housing filled with said electrolyte, said electrolyte including radiation oxidizable material and radiation reducible material, catalytic material taken from the group consisting of platinum and platinized platinum disposed within said electrolyte, first and second electrodes spaced from each other each having one end immersed in said electrolyte and another end extending outside of said housing, said first and second electrodes of a material selected from the group consisting of platinum, gold, graphite, conductive ceramic and platinized platinum, a first portion of insoluble radioactive material selected from the group consisting of curium-244, thorium-229, thorium-230, actinium-227, plutonium-238, plutonium-239, and combinations thereof disposed in said electrolyte at from contacting to about one centimeter distance from said first electrode and restraining means for maintaining said first portion of said radioactive material at said first electrode.

2. The battery of claim 1 further comprising a second portion of insoluble radioactive material selected from the group consisting of curium-244, thorium-229, thorium-230, actinium-227, plutonium-238, plutonium-239, and combinations thereof disposed in said electrolyte at from contacting to about one centimeter distance from said second electrode, said second portion having a radioactivity intensity of at least 10% different radioactive emission value than said first portion of radioactive material and restraining means for maintaining said second portion of said radioactive material at location at said second electrode.

3. The battery of claim 2 wherein said restraining means is a wire mesh screen basket.

4. The battery of claim 2 wherein said first and second portions of radioactive material comprise plutonium dioxide microspheres wherein said plutonium comprises about 80% plutonium-238 and about 20% plutonium-239, and said electrolyte is taken from the group consisting of from about 0.5 Normal to about 2 Normal hydrobromic acid and from about 0.01 Molar to about 5 Molar copper (II) chloride.

5. The battery of claim 2 wherein said first and second portions of said insoluble radioactive material are in the form of microspheres.

6. The battery of claim 1 wherein said electrolyte is selected from the group consisting of hydrobromic acid, nitric acid, hydrochloric acid, copper (II) chloride in water and iron chloride in hydrochloric acid.

* * * * *